A. LOOMIS.
SPEEDOMETER DRIVING MECHANISM.
APPLICATION FILED JULY 3, 1912.

1,226,784. Patented May 22, 1917.

Witnesses
F. C. Gibson.
B. M. Kent.

Inventor
Allen Loomis
by Foster Freeman Watson &c
Attorneys

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

SPEEDOMETER DRIVING MECHANISM.

1,226,784. Specification of Letters Patent. Patented May 22, 1917.

Original application filed May 19, 1909, Serial No. 497,047. Divided and this application filed July 3, 1912. Serial No. 707,540.

*To all whom it may concern:*

Be it known that I, ALLEN LOOMIS, a citizen of the United States, residing at Detroit, Wayne county, State of Michigan, have invented certain new and useful Improvements in Speedometer Driving Mechanism, of which the following is a specification.

This application is a division of my application Serial No. 497,047, filed May 19, 1909.

This invention relates to automobiles and particularly to mechanism for driving indicators such as speedometers, odometers, taximeters, etc.

Heretofore these various indicators have been driven from the road wheels of the automobile through a flexible shaft extending from the indicator on the dash to the front wheels where the shaft is connected through a pair of spur gears to the road wheel, one of the gears being mounted directly on the wheel. Thus the gears are necessarily exposed and cannot be lubricated. Aside from the wear thus necessitated the gearing is liable to injury from stones, mud, etc., thrown up from the road.

It is one of the objects of this invention to so construct the indicator driving mechanism that the gears and driving shafts may be entirely inclosed where they may be properly lubricated and be free from external injury. Another object is to construct such mechanism so that it may be built up with the machine or may be placed on the machine after it has been constructed. Other objects will appear in the detailed description.

A driving shaft is mounted in and extends through the spindle which is mounted upon the knuckle and connects at the outer end with the hub of the wheel. The inner end of the driving shaft is provided with a gear which meshes with a gear on a driven shaft journaled in the knuckle, this driven shaft being a flexible shaft and connected to the indicator mounted upon the dash. The gears are entirely inclosed by a housing which housing protects the gear against injury and allows the mechanism to be packed in grease. This housing may be a separate housing bolted or otherwise secured to the knuckle or spindle, forming a support for the driving and driven shafts, or the knuckle may be hollow and the gears mounted in the cavity. When the knuckle is of the hollow construction a removable cap is provided whereby the gears and driving shaft may be removed.

Figure 1:
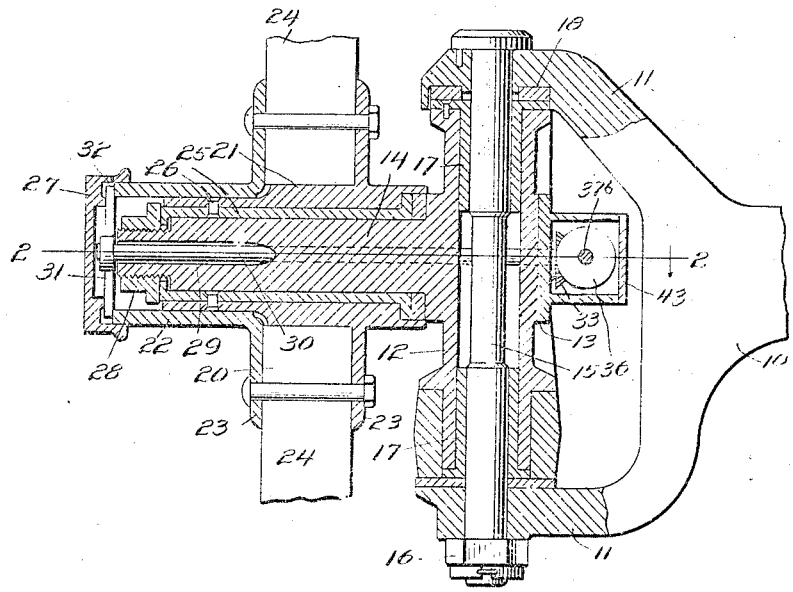
Figure 1 is a vertical section through a steering knuckle and wheel hub embodying the invention.
Figure 2:
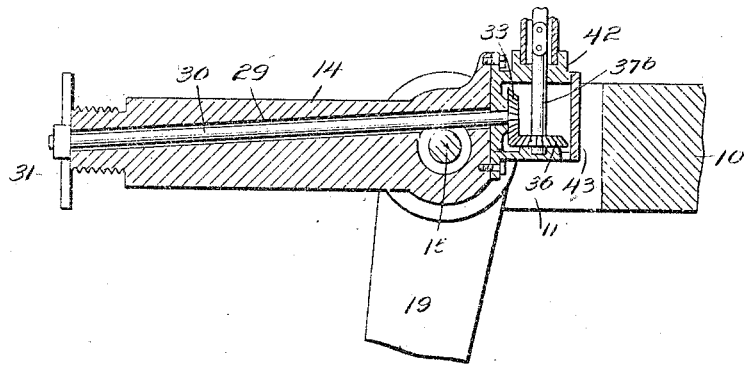
Fig. 2 is a horizontal section on the line 2—2 of Fig. 1.

Referring to the drawings 10 designates a front axle provided with a yoke forming yoke arms 11. A steering knuckle 12, consisting of a body portion 13 and having a spindle 14, is mounted on a pivot pin 15 extending through the knuckle and the yoke arms and secured in place by a nut 16 and cotter pin as shown in Fig. 1. The knuckle is preferably provided with the usual bushings 17, and a thrust ring 18 is provided to transmit the weight of the vehicle to the wheels. The knuckle is provided with an arm 19 which connects with the usual steering mechanism. The road wheel 20 comprises an inner hub member 21, an outer hub member 22, which hub members are provided with flanges 23, 23, and spokes 24 clamped and bolted in place between the flanges 23, 23 by bolts or rivets as shown. The bushing 25 is riveted or otherwise secured to the inner hub member 21 by fastenings 26 and is mounted upon the spindle 14. The usual hub cap 27 is provided which screws on the end of the hub 22, and the nut 28 secures the wheel in place.

Figure 3:
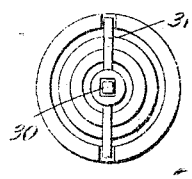
Fig. 3 is an end view of the outer end of the wheel hub, shown in Fig. 1, with the hub cap removed.

Through the spindle 14 extends a bore 29 forming a bearing for the driving shaft 30. On the outer end of the driving shaft is mounted a spider 31 provided with radial arms which enter recesses 32 formed in the end of the hub 22. The spider 31, as shown in Fig. 3, is provided with a square hole engaging a similar squared section of the shaft. A housing 42 may be screwed or otherwise secured to the knuckle or spindle and a shaft 37$^b$ is journaled in this housing. The shaft 30 passes to one side of the pivot pin 15 and not being arranged on the axis of the spindle, the outer end of the shaft is loosely splined in the spider 31 so as to allow a slight universal movement which is necessary on account of the angular relation of the shaft 30 and the spider 31.

A bevel gear 33 is arranged on the end of shaft 30 in housing 42 and meshes with a gear 36 mounted on the shaft 37$^b$, which is flexible and extends to the indicator on the dash. In order to permit removal and inspection of the parts arranged in the housing 42, a suitable cover plate 43 is provided.

By this arrangement of the parts it will be seen that the shaft 30 and the gears may be withdrawn from the inner end of the spindle without removing or disturbing in any way the hub cap or bearings, or the knuckle pivot pin. Since all of the driving parts are mounted in a separate casing, this construction may be applied to vehicles after they have been built.

Although this invention is shown as applied to a hub and spindle having the plain bearings it is obvious that this construction may be applied to a hub and a spindle of the roller bearing construction. It will also be noted that certain features of construction may be applied to spindles not mounted on a knuckle.

It is obvious that various changes in the details of construction may be made without departing from this invention and it is therefore to be understood that this invention is not to be limited to the specific construction shown and described.

Having thus described the invention what is claimed as new is:

1. In a vehicle, the combination with a steering knuckle having a spindle and a road wheel mounted on the spindle, of an indicator driving mechanism mounted upon the knuckle and having a shaft extending through the spindle, a connection between the shaft and the hub of the wheel, and a casing for the driving mechanism removably secured to the knuckle.

2. In a vehicle, the combination with a steering knuckle having a spindle and a road wheel mounted on the spindle, of an indicator driving mechanism, a removable housing supporting the indicator driving mechanism and secured to the knuckle, and an operative connection between said mechanism and the wheel.

3. In a vehicle, the combination with a steering knuckle having a spindle and a road wheel mounted on the spindle, of an indicator driving mechanism including a driving and a driven shaft, a pair of intermeshing gears on said shafts, a removable housing for said gears supporting the shafts, and a detachable operative connection between the driving shaft and the wheel.

4. In a vehicle, the combination with the axle and the steering spindle, of an indicator driving mechanism having a shaft extending through the spindle, and a pivotal connection for said spindle to said axle having its axis offset from the axis of said shaft.

5. In a vehicle, the combination with the axle and the steering spindle, of an indicator driving mechanism comprising a shaft extending through the spindle, a connection from the shaft to the vehicle wheel, and intermeshing gears at the inner end of the shaft, and a pivotal connection for said spindle to said axle having its axis offset from the axis of said shaft.

6. In a vehicle, the combination with the axle and the steering spindle, of an indicator driving mechanism comprising a shaft extending through the spindle, a connection from the shaft to the vehicle wheel, and intermeshing gears at the inner end of the shaft, and a pivotal connection between said spindle and said axle having its axis offset from the axes of said gears.

7. In a vehicle, the combination with the axle, the steering spindle pivoted to the axle and the wheel mounted on the steering spindle, of an indicator driving shaft extending through the spindle at an angle to the axis of the spindle and a universal joint connection between said shaft and the wheel.

8. In a vehicle, the combination with the axle, the steering spindle pivoted to the axle, and the wheel mounted on the steering spindle, of an indicator driving shaft extending through the spindle and arranged to be withdrawn from the inner end of the spindle, and means operatively connecting the outer end of said shaft and the wheel and having a loose connection with the shaft so that the latter may be withdrawn therefrom in the direction of its axis without disturbing the wheel or the spindle pivot.

9. In a vehicle, the combination with the axle, the steering spindle pivoted to the axle and having a chamber at its inner end, and the wheel mounted on the steering spindle and having a hub cap, of an indicator shaft extending through the spindle and arranged to be withdrawn from the inner end of the spindle, means operatively connecting the outer end of said shaft and the wheel and having a loose connection with the shaft permitting the latter to be withdrawn therefrom in the direction of its axis without disturbing the wheel or its hub cap, and a removable cover plate for said chamber.

10. In a vehicle, the combination with the axle and the steering spindle, of an indicator driving mechanism comprising a shaft extending through said spindle and having a gear on its inner end, a vertical pivotal connection between said spindle and said axle and arranged wholly out of alinement with said shaft, and an indicator driving shaft having a gear in mesh with said first mentioned gear.

In testimony whereof I affix my signature in presence of two witnesses.

ALLEN LOOMIS.

Witnesses:
  J. H. HUNT,
  J. B. BOYCE.